May 9, 1961  F. G. REUTER ET AL  2,983,504

SPRING

Filed Feb. 4, 1957

INVENTORS
Franz Gottfried Reuter and
Jürgen Lüdemann
By Clelle W. Upchurch
ATTORNEY.

United States Patent Office 2,983,504
Patented May 9, 1961

2,983,504
SPRING

Franz Gottfried Reuter and Jürgen Ulderup, Lemforde, Kreis Diepholz, Germany, assignors, by mesne assignments, to Mobay Chemical Company, Pittsburgh, Pa., a corporation of Delaware Filed Feb. 4, 1957, Ser. No. 638,112
5 Claims. (Cl. 267—56)

This invention relates to vehicle springs and, more particularly, to an improved vehicle spring and supporting member.

The conventional leaf spring used in vehicles of various types is ordinarily securely attached at each end to the vehicle frame but forms a sliding fit between members of a support attached to the frame at least at one end. Some means must be provided for permitting changes in length of the spring as the load thereon and the amount of compression changes, so the spring is supported against the frame in such a manner that the end thereof can slide as the spring length changes. As the amount of compression changes and the end of the spring slides through the supporting members, its surfaces rub against the surface of the supporting member and, in order to avoid wear and squeaking, the end of the spring is lubricated. In spite of the lubrication, however, the bearing surface of the spring or the support wears away and must be replaced, particularly in areas where dust and particles of other solid materials become embedded in the lubricant.

It is an object of this invention to provide an improved slide bearing for vehicle springs. Another object of the invention is to provide a vehicle spring and a means for attaching the spring to the frame with a supporting member which permits the spring to slide as it is compressed and which has bearing surfaces which are less subject to wear than the heretofore available springs and supports. Still another object of the invention is to provide improved bearing surfaces in the supporting member of a leaf spring attached to a vehicle frame. Another object is to provide an improved support for attaching the sliding end of a spring to another member.

Figure 1:
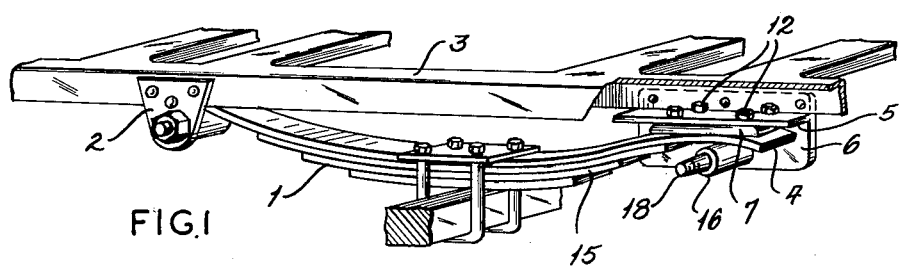
Figure 2:
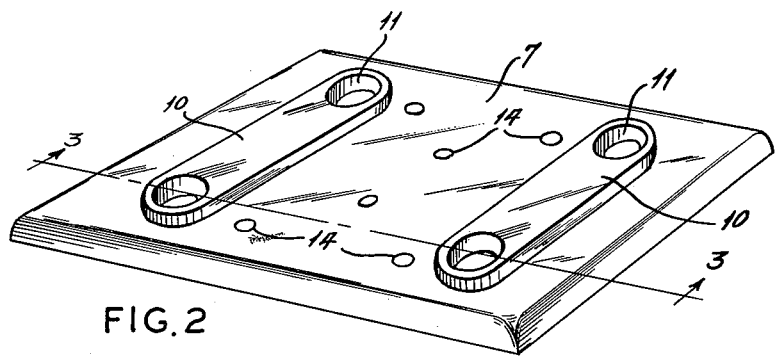
Figure 3:
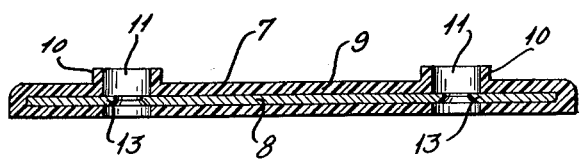

Other objects will become apparent from the following description with reference to the accompanying drawing in which Figure 1 is a fragmentary elevation of an embodiment of the invention attached to a vehicle frame;

Figure 2 is a perspective view of an embodiment of the bearing surface of the supporting member for a vehicle spring; and Figure 3 is a cross-sectional view of the embodiment of Figure 2 taken along the line III—III.

In the copending application Serial No. 565,555, filed February 15, 1956, now Patent No. 2,951,053, by Franz Gottfried Reuter and Jürgen Ulderup, of which this application is a continuation-in-part, it is disclosed that bearing surfaces having improved friction properties are provided by forming the bearing surface from a rubber-like polyurethane plastic containing a silicone oil and particles of molybdenum disulfide. In accordance with that invention, the polyurethane plastic is prepared by reacting a higher molecular weight organic compound having terminal hydroxyl groups such as, for example, a linear polyester, a polyesteramide, a polyalkylene ether glycol or a polyalkylene thioether glycol having terminal hydroxyl groups with an excess of a suitable diisocyanate and subsequently reacting this product with a bifunctional compound which will bring about cross-linking, such as, for example, a glycol, a diamine, an amino alcohol or water. Suitable rubber-like polyurethane plastics may be made in accordance with the process disclosed in U.S. Patents 2,620,516 and 2,729,618.

In accordance with the instant invention, it has been found that a vehicle leaf spring having one end thereof adapted to move with respect to a bearing surface of the member which attaches it to the frame of the vehicle is advantageously at least surface coated with a rubber-like polyurethane plastic containing a silicone oil and molybdenum disulfide. Therefore, in accordance with this invention, the bearing surface of the member which supports the sliding end of a leaf spring is preferably molded from a polyurethane plastic containing a silicone oil and molybdenum disulfide. In order to strengthen the bearing member and in order to facilitate attaching the bearing member to the other parts of the support, it is preferred to provide the bearing member with a core formed from a suitable metal.

The molybdenum disulfide and the silicone oil with or without a hydrocarbon added thereto may be introduced in the polyurethane plastic at any stage during the reaction between the organic compound having the terminal hydroxyl groups and the polyisocyanate. It is preferred, however, to mix these additives into the reaction mixture by incorporating them in the organic compound having the terminal hydroxyl groups before mixing it with the polyisocyanate.

The molybdenum disulfide should preferably be of a high technical grade and of high purity and if it approaches chemically pure molybdenum disulfide, it may be advantageously incorporated into the reaction mixture after the polyisocyanate has been mixed with the organic compound having the terminal hydroxyl groups. Methods for preparing substantially pure molybdenum disulfide are disclosed in U.S. Patents 2,367,946 and 2,686,156. The products of the methods disclosed in these patents are particularly well suited for use in this invention.

From about 0.01% to about 5% by weight of molybdenum disulfide, and preferably from about 0.1% to about 1% by weight, based on the weight of the cured rubber-like polyurethane plastic, is used in accordance with this invention in preparing the plastic bearing surface. Any suitable solid form of molybdenum disulfide may be used, but it is preferred to use a molybdenum disulfide powder having a particle size within the range of from about 0.002 to about 2 mm. in cross-sectional dimension and preferably from about 0.002 to about 0.02 mm. in order to obtain maximum abrasion resistance.

The combined amount of silicone oil and hydrocarbon used in preparing the bearing surface is preferably from about 0.01% to about 5% by weight, based on the weight of the cured rubber-like polyurethane plastic, but in some instances even greater amounts may be used if desired.

The molecular weight of the polyester or other polyhydroxy compound should be at least about 800.

Any suitable liquid organo-polysiloxane may be used as the silicone oil provided the viscosity thereof is from about 50 to about 500 centistokes at 20° C. Examples of suitable silicone oils include dimethylsiloxane polymers having a viscosity of about 50 centistokes, dimethylsiloxane polymers having a viscosity of about 140 centistokes at 20° C. and dimethylsiloxane polymers having a viscosity of about 440 centistokes at 20° C. and mixtures thereof.

Any suitable hydrocarbon may be utilized, including high-boiling petroleum fractions, such as, for example, kerosene, conventional lubricating oils, waxes, including paraffin, montan wax, beeswax, ceresin, and the like.

Any suitable linear hydroxy polyester may be used, including those disclosed in the aforesaid patents, U.S.

2,620,516 and 2,729,618. For example, polyesters formed by conventional thermal esterification methods of dihydric alcohols and dibasic organic acids may be used as the organic compound having the terminal hydroxyl groups. The alcohol component should be used in such amount as to produce a final product having an hydroxyl number within the range of from about 20 to about 80. Examples of suitable dicarboxylic acids include adipic acid, succinic acid, and the like. The dihydric alcohol may be ethylene glycol or other suitable glycol. A convenient method for carrying out the thermal esterification involves heating the reactants to a temperature of from about 110° to about 120° C. until water formed during the esterification is removed by distillation and then raising the temperature to from about 210° C. to about 220° C. under reduced pressure until esterification is completed. The resulting polyester having terminal hydroxyl groups is then dehydrated by maintaining it at a temperature of from about 110° C. to about 150° C. under a pressure less than atmospheric or while covered with an inert gas, such as nitrogen, until all of the moisture has been removed. If a polyesteramide is to be produced, a certain amount of an amine or an amino alcohol is mixed with the other starting materials used in making the polyester. Suitable polythioethers may be prepared by thermal condensation of a thioether glycol with a polyhydric alcohol in a molar ratio of from about 1:1 to about 1:1.5. The reaction mixture is heated in the presence of a dehydration catalyst to a temperature of from about 150° C. to about 250° C. to remove the water formed during esterification by distillation.

Any suitable diisocyanate may be used to react with the linear hydroxyl polyester, polyalkylene ether glycol or polyalkylene thioether glycol, including 2,4-toluylene diisocyanate, 2,6-toluylene diisocyanate, p-phenylene diisocyanate, 4,4'-diphenylmethane diisocyanate, 1,5-naphthylene diisocyanate, dibenzidene diisocyanate, and benzidene diisocyanate. From about 20 to about 250% excess diisocyanate over that required to react with all of the reactive hydrogen atoms of the polyester or other organic compound having terminal hydroxyl groups should be used and the reaction is preferably carried out at temperatures of from about 80° C. to about 180° C. The isocyanate-modified polyester is subjected to a cross-linking reaction with a glycol, diamine, amino alcohol or other suitable bifunctional compound to obtain a cured rubber-like polyurethane plastic. Any suitable glycol such as, for example, 1,2-propylene glycol, 1,3-butylene glycol, 1,4-butylene glycol, quinite or the like, may be utilized. Examples of suitable amino alcohols include amino propanol, β-amino propanol, and γ-amino alcohol. The mixture of isocyanate-modified polyester or isocyanate-modified condensation product of a polyalkylene thioether glycol or polyalkylene ether glycol with the polyhydric alcohol is heated from a temperature of about 60° C. to about 180° C. until the cross-linking reaction has been completed. It is preferred to dissolve a small amount of acid, such as dry hydrogen chloride, or an acid-producing compound, such as, for example, acid chlorides, like acetyl chloride or thionyl chloride, in the cross-linking agent to slow down the cross-linking reaction which is accelerated by the presence of molybdenum disulfide. Usually from about 0.001 to about 1% acid, and preferably, from about 0.002 to about 0.1% by weight, based on the weight of the cross-linking agent, is used.

As already pointed out, the required amount of molybdenum disulfide, silicone oil and hydrocarbon is preferably added to the polyester but, if desired, in some instances, it may be added to the isocyanate-modified polyester or to the cross-linking agent.

It has been found that bearing surfaces of rubber-like polyurethane plastics having the molybdenum disulfide and silicone oil display an extraordinarily low coefficient of friction. For example, the coefficient of friction between the rubber-like polyurethanes and steel is about 0.1.

Referring now to the drawing, a leaf spring 1 is shown attached at one end to vehicle frame 3 by means of support 2. The other end of spring 1 is attached to frame 3 by means of support 6 which is a flanged member bolted to frame 3. Flange 5 has a bearing surface plate 7 bolted thereto and the end 4 of spring 1 is slidably fit between bearing surface plate 7 and bushing 16 mounted on pin 18. As spring 1 is compressed, end 4 moves with respect to plate 7 and rubs against the surface of plate 7. As shown in more detail in Figures 2 and 3, plate 7 is molded from a polyurethane plastic containing molybdenum disulfide and silicone oil and is provided with guiding and reinforcing bosses 10 provided with holes 11 for attaching plate 7 to flange 5 with bolts 12. It is preferred to mold the polyurethane plastic about a suitable metal plate 8 having holes 13 therein in order to provide a plate having the desirable bearing surface and, at the same time, having sufficient strength to be attached to flange 5 with bolts 12. Free metal parts 13 extend from the plastic at holes 11. In other words, the holes in the metal plate are of lesser diameter than the inner diameter of boss 10 in order that the heads of the bolts seat on the metal insert 8.

As shown in Figure 2, plate 7 is provided with one or more holes 14 between bosses 10 through which lubricating oil can be introduced to the moving parts.

In another embodiment of the invention, metal plate 8 is not required and the entire plate 7 is molded from a polyurethane plastic containing silicone oil and a molybdenum disulfide. In this embodiment, however, metal rings are inserted in bosses 10 to increase the strength and to insure that plate 7 can be secured by means of bolts 12 to flange 5.

In forming a suitable bearing plate 7 in accordance with one embodiment of this invention, about 1,000 parts by weight of a linear hydroxyl polyester obtained by thermal esterification of adipic acid with ethylene glycol and having a molecular weight of about 2,000, an hydroxyl number of about 50 and an acid number of about 1 is heated at about 135° C. at less than atmospheric pressure and preferably at a pressure approaching a vacuum for about one hour until substantially all the moisture has been removed. About 3 parts molybdenum disulfide powder having a particle size of about 0.01 mm. in diameter, about 3 parts of a dimethylsiloxane polymer having a viscosity of about 140 centistokes at about 20° C., and about 2 parts paraffin wax are then added to the polyester. About 300 parts by weight naphthylene-1,5-diisocyanate are next introduced into the mixture and reaction is brought about by allowing the mixture to set for about 10 minutes while the pressure in the reaction vessel is less than atmospheric. About 70 parts 1,4-butanediol containing about 1% dry hydrogen chloride are added within about 1 minute while stirring the mixture vigorously. The resulting product is poured into a suitable mold containing metal plate 8 which is preferably steel or a hard copper alloy, such as bronze, and maintained at about 110° C. for about 24 hours or until the polyurethane plastic has cured into a rubber-like polyurethane plastic.

Other polyurethane plastic compositions particularly well suited for use in molding plate 7, either with or without metal plate 8, are disclosed in the aforesaid patent application Serial No. 565,555. Any suitable metal may be used for making plate 8.

Although the invention has been described in considerable detail in the foregoing, it is to be understood that such detail is solely for the purpose of illustration and that variations can be made by those skilled in the art without departing from the spirit or scope of the invention except as is set forth in the claims.

What is claimed is:

1. In combination, a leaf spring and means for attaching said spring to a vehicle frame, said means comprising a bearing plate of molded polyurethane plastic containing a silicone oil and molybdenum disulfide, one end of said spring slidably mounted against said plate whereby said end rubs against said plate as compression of the spring changes said bearing plate having a metallic reinforcing member imbedded therein, holes extending through said bearing plate and said metallic reinforcing member, the holes through said metallic reinforcing member being of lesser diameter than the holes through said bearing plate.

2. In a vehicle leaf spring having one end in sliding contact with the vehicle frame, the improvement which comprises a resilient polyurethane plastic bearing plate having imbedded therein a metallic supporting member, a plurality of apertures extending through the polyurethane plastic and metal supporting member for bolting said bearing plate to said vehicle frame, the diameter of said aperture through said metallic supporting member being less than the diameter of said aperture through said polyurethane plastic to provide a seat for the heads of bolts used for joining the bearing surface to said frame member.

3. In combination, a leaf spring having an end slidably mounted to a vehicle frame, a support comprising a flanged member and a pin, one end of said spring lying therebetween and adapted to move as compression of the spring changes, a bearing member attached to said flanged member and lying against said end of the spring, said bearing member being a molded metal reinforced polyurethane plastic containing a silicone oil and molybdenum disulfide, said metal reinforced plastic member having holes provided therethrough, said holes through said metal having a lesser diameter than the holes through said plastic.

4. A vehicle support system comprising, in combination, a vehicle frame, a leaf spring, means for carrying an axle on said spring, means for fixedly securing one end of said spring to said frame, means for slidably connecting the other end of said spring to said frame comprising a metal reinforced polyurethane plate between said frame and the last said end, said polyurethane containing a silicone oil and molybdenum disulfide, said slidable end being adapted to rub against said plate as the compression of said spring changes, said polyurethane plate and metallic reinforcing member having holes therethrough, said holes through said metallic reinforcing member having a lesser diameter than the holes through said polyurethane plate.

5. In combination, a leaf spring and means for attaching said spring to a vehicle frame, said means comprising a bearing plate of molded polyurethane plastic containing a silicone oil and molybdenum disulfide, one end of said spring slidably mounted against said plate whereby said end rubs against said plate as compression of the spring changes, said bearing plate having a metallic reinforcing member imbedded therein, holes extending through said bearing and said metallic reinforcing member adapted to accommodate means for securing said bearing plate to said frame.

References Cited in the file of this patent
UNITED STATES PATENTS

| | | |
|---|---|---|
| 1,691,185 | Goode | Nov. 13, 1928 |
| 2,449,510 | Robertson | Sept. 14, 1948 |
| 2,460,361 | Petho | Feb. 1, 1949 |
| 2,686,155 | Willis | Aug. 10, 1954 |
| 2,703,710 | Sterne | Mar. 8, 1955 |
| 2,770,612 | Schollenberger | Nov. 13, 1956 |
| 2,776,135 | Assmus | Jan. 1, 1957 |
| 2,814,604 | Nichols | Nov. 26, 1957 |

FOREIGN PATENTS

| | | |
|---|---|---|
| 711,620 | Great Britain | July 7, 1954 |